Dec. 12, 1961 C. H. GOLDIE 3,013,201

SELF-EXCITED VARIABLE CAPACITANCE ELECTROSTATIC GENERATOR

Filed May 31, 1960

3,013,201
SELF-EXCITED VARIABLE CAPACITANCE ELECTROSTATIC GENERATOR

Charles H. Goldie, Bedford, Mass., assignor to High Voltage Engineering Corporation, Burlington, Mass., a corporation of Massachusetts Filed May 31, 1960, Ser. No. 32,821
4 Claims. (Cl. 322—2)

This invention relates to electrostatic generators wherein the charge transfer mechanism makes use of capacitive effects between charged bodies and electrodes upon which charge is to be induced, and in particular to the self-excitation of such generators.

The invention may best be understood from the following detailed description thereof, having reference to the accompanying drawings in which.

Figure 1:
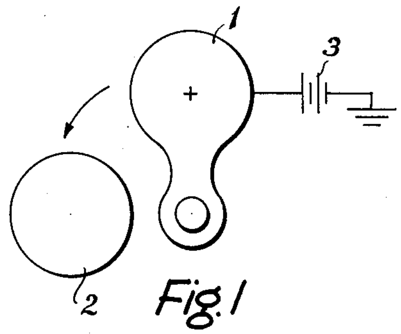
FIG. 1 is a diagram illustrating one form of a variable-capacitance electrostatic generator.

Referring to FIG. 1 of the drawings, therein is shown a rotor 1 and a stator 2. The rotor 1 has a charge thereon and in FIG. 1, it is charged positively. A power supply 3 is indicated for maintaining the charge on the rotor 1.

Figure 2:
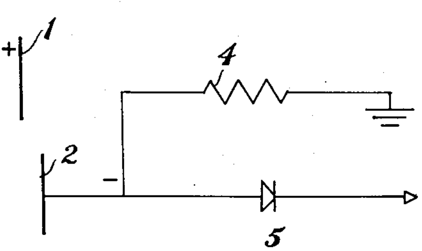
FIG. 2 is another diagram further illustrating the arrangement of FIG. 1.

Referring now to FIG. 2, it will be seen that the stator 2 is connected to ground by a resistive path 4 which is connected in parallel with at least one rectifier 5 so that current can flow in only one direction between the stator 2 and ground.

Figure 3:
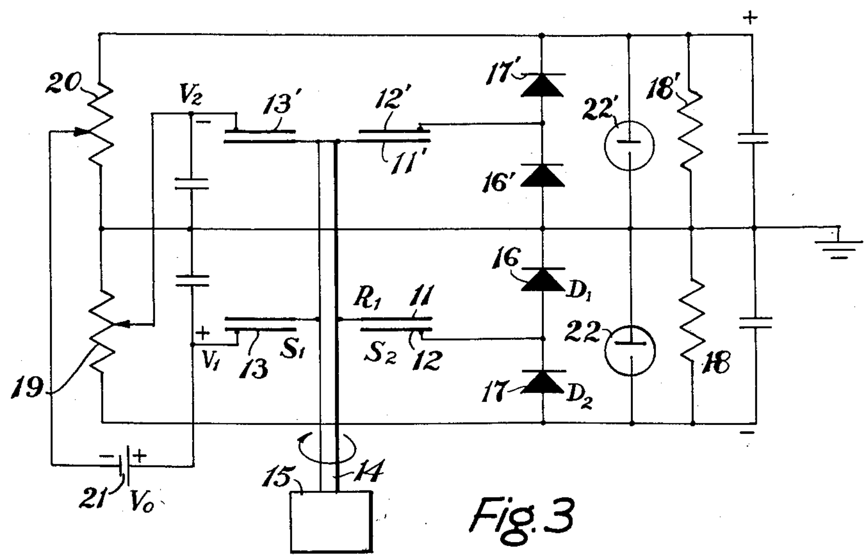
FIG. 3 is a diagram illustrating a modification of the apparatus of FIG. 1 and embodying the invention.
Figure 4:
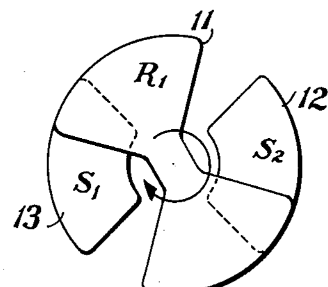
FIG. 4 is a diagram illustrating a portion of the apparatus of FIG. 3.

In the device shown in FIGS. 3 and 4 the rotor serves as a capacitive link between a stationary charging electrode and a stator. Referring thereto, a rotor 11 periodically passes close to a stator 12. However, instead of carrying its own charge as in the device of FIGS. 1 and 2, the necessary inducing charge on the rotor 11 is itself induced on the rotor 11 by the charging electrode 13. Thus when one end of the rotor 11 is in the vicinity of the stator element 12 and the opposite end of the rotor element 11 is in the close vicinity of the charging electrode 13, a negative charge is induced on that portion of the rotor 11 which is near the charging electrode 13 with the result that positive charge appears at the opposite end of the rotor 11 since the rotor 11 must itself be electrically neutral.

The invention will now be described with reference to the apparatus shown in FIGS. 3 and 4, but it will be clear from the foregoing that the invention could equally well be used with a device of the type shown in FIGS. 1 and 2. The principal advantage of the device shown in FIGS. 3 and 4 is the fact that it eliminates the necessity for a brush on the rotor to supply charge thereto, since the charge on the rotor is induced capacitively.

Referring back briefly to FIGS. 1 and 2, it will be recalled that the invention is concerned with the construction of a self-excited generator with no external energy other than shaft power supplied. That is to say, the objective is a completely self-charging generator. Referring to FIGS. 1 and 2, it will be seen that direct feedback of the output to the induction plate is ruled out by the polarity switch inherent in this type of machine. The difficulty is avoided by the two section unit shown in FIGS. 3 and 4. Here a fraction of the output voltage of each section is fed to the induction plate of the other.

The action of the circuit is best understood by looking first at the lower section only. The rotor 11 is an electrically isolated flat fan-like rotor mounted on an insulating shaft 14 driven by an appropriate motor or other prime mover 15. As it rotates, the rotor 11 periodically covers the stator 2 and the charging electrode 13, which are each insulated and sector-shaped. The charging electrode 13 is maintained at a positive D.C. potential with respect to ground. As the rotor 11 rotates into a position covering the charging electrode 13 and the stator 12, the capacitance between the charging electrode 13 and the stator 12 increases and negative charge is induced from ground through a rectifier 16 to the stator 12. As the rotor 11 uncovers the stator 12 and the charging electrode 13, the capacitance decreases and the stator 12 rises in potential negative with respect to ground. The rectifier 16 blocks any flow of negative charge from the stator 12 and as the negative potential of the stator 12 rises, current flows through a second rectifier 17 to the load 18. A fraction V2 of this negative load voltage is applied to the charging electrode or induction plate 13' of the second or upper section by means of the potentiometer 19. The charging action in this second section is identical to that in the first section except for reversed polarities and the output of the second section is correspondingly fed-back to the first section induction plate 13 via a second potentiometer 20. The variable resistors of the potentiometers 19, 20 control the output voltage and power by adjusting the feedback ratios.

The circuit is regenerative; it remains only to supply a small reference voltage to start in the right direction. The use of stator and rotor materials with suitable contact potentials is one solution to this; a small battery 21, which might be, for example, of the nuclear type, in one induction line as shown is another solution. Suitable voltage limiting devices such as corona tubes 22 would be added either across the induction plate 13 or, as shown in FIG. 3, across the load 18 as checks to prevent excessive voltage build-up.

A number of features inherent with this circuit are of interest.

The usual slip rings and brushes are eliminated by the use of the stator 12 and the charging electrode 13, and an isolated rotor 11 rather than a single stator 2 and a rotor 1 maintained at constant induction potential as shown in FIGS. 1 and 2.

In spite of the fact that the second section was added for the purpose of self-excitation, both output voltages are added together across the load 18, 18'. The arrangement pictured is merely for explanation of the self-excitation principle. The ground shown, for example, is not required; and for higher voltages, the units may be cascaded with a common insulating drive shaft 14. For a given total voltage output, the number of rotor stator sets is the same for this self-charge generator as for a generator requiring auxiliary charging supplies.

Two poles are shown for simplicity; in an actual machine a greater number would be more practical. The system also applies equally well to other geometrical arrangements, such as the concentric or segmented drum design mentioned in U.S. Patent Application Serial No. 829,823.

Having thus described the principles of the invention, together with an illustrative embodiment thereof, it is to be understood that, although specific terms are employed, they are used in a generic and descriptive sense and not for purposes of limitation, the scope of the invention being set forth in the following claims.

I claim:

1. A self-excited variable-capacitance D.-C. generator comprising in combination a first and a second electrode, a third and a fourth electrode capacitively coupled to said first and second electrodes respectively, means for varying the capacitance between said first and third electrodes and between said second and fourth electrodes, a first rectification means between said third and fourth electrodes, a load one end of which is connected to said third electrode through a second rectification means and the other end of which is connected to said fourth electrode through a third rectification means, said rectification means being thus connected in series and with the same orientation, and means for utilizing a portion of the voltage across said load to charge said first and second electrodes in mutually opposite senses.

2. A self-excited variable-capacitance D.-C. generator comprising in combination a first and a second rotor, a first and a second stator capacitively coupled to said first and second rotor respectively, means for rotating said rotors so as to vary the capacitance between said first rotor and said first stator and between said second rotor and said second stator, a first rectification means between said stators, a load one end of which is connected to said first stator through a second rectification means and the other end of which is connected to said second stator through a third rectification means, said rectification means being thus connected in series and with the same orientation, and means for utilizing a portion of the voltage across said load to charge said rotors in mutually opposite senses.

3. A self-excited variable-capacitance D.-C. generator comprising in combination a first and a second charging electrode, a first and a second stator, a first rotor capacitively coupling said first charging electrode and said first stator, a second rotor capacitively coupling said second charging electrode and said second stator, means for rotating said rotors so as to vary the capacitance between said charging electrodes and said stators, a first rectification means between said stators, a load one end of which is connected to said first stator through a second rectification means and the other end of which is connected to said second stator through a third rectification means, said rectification means being thus connected in series and with the same orientation, and means for utilizing a portion of the voltage across said load to charge said charging electrodes in mutually opposite senses.

4. A self-excited variable-capacitance D.-C. generator comprising in combination a first and a second charging electrode, a first and a second stator, a first rotor capacitively coupling said first charging electrode and said first stator, a second rotor capacitively coupling said second charging electrode and said second stator, means for rotating said rotors so as to vary the capacitance between said charging electrodes and said stators, a first rectification means between said stators, a load one end of which is connected to said first stator through a second rectification means and the other end of which is connected to said second stator through a third rectification means, said rectification means being thus connected in series and with the same orientation, means for utilizing a portion of the voltage across said load to charge said charging electrodes in mutually opposite senses, and voltage limiting means across said load.

No references cited.